United States Patent
Bakmazjian et al.

(10) Patent No.: US 10,722,974 B2
(45) Date of Patent: Jul. 28, 2020

(54) SYSTEM AND METHOD FOR PROCESSING PARTS ON A WORKPIECE

(71) Applicant: HYPERTHERM, INC., Hanover, NH (US)

(72) Inventors: Chahe Bakmazjian, Laval (CA); Peter V. Brahan, North Sutton, VT (US)

(73) Assignee: Hypertherm, Inc., Hanover, NH (US)

( * ) Notice: Subject to any disclaimer, the term of this patent is extended or adjusted under 35 U.S.C. 154(b) by 70 days.

(21) Appl. No.: 15/875,963

(22) Filed: Jan. 19, 2018

(65) Prior Publication Data
US 2018/0207747 A1    Jul. 26, 2018

Related U.S. Application Data

(60) Provisional application No. 62/448,545, filed on Jan. 20, 2017.

(51) Int. Cl.
| | | |
|---|---|---|
| *B23K 26/03* | (2006.01) | |
| *B23K 26/38* | (2014.01) | |
| *B05B 15/02* | (2006.01) | |
| *B23K 10/00* | (2006.01) | |
| *G05B 15/02* | (2006.01) | |

(52) U.S. Cl.
CPC ............ *B23K 26/032* (2013.01); *B23K 10/00* (2013.01); *B23K 26/38* (2013.01); *G05B 15/02* (2013.01)

(58) Field of Classification Search
CPC ...... B23K 10/00; B23K 26/032; B23K 26/38; G05B 15/02
See application file for complete search history.

(56) References Cited

U.S. PATENT DOCUMENTS

| | | | | |
|---|---|---|---|---|
| 4,725,961 | A * | 2/1988 | Pearl ........................ | A43D 8/00 700/171 |
| 6,205,370 | B1 * | 3/2001 | Blaimschein ............ | B26D 5/00 700/134 |
| 6,470,228 | B1 * | 10/2002 | Turner ................. | G06Q 10/087 700/107 |
| 6,580,963 | B2 * | 6/2003 | Susnjara .......... | G05B 19/41865 700/171 |
| 6,856,843 | B1 * | 2/2005 | Herman, Jr. ............. | B26D 5/00 700/134 |
| 7,089,082 | B1 * | 8/2006 | Lukis ................. | G05B 19/4097 700/182 |
| 7,107,233 | B2 * | 9/2006 | Des Champs ......... | G06Q 10/06 705/80 |

(Continued)

*Primary Examiner* — M. N. Von Buhr
(74) *Attorney, Agent, or Firm* — David B. Tingey; Bryant J. Keller; Kirton McConkie (57) ABSTRACT

A system and method for processing parts from a workpiece is provided. The method may include identifying characteristics of a workpiece to be processed, nesting, by a computer controller, a first nest pattern of a local first part to be cut out of the workpiece, identifying, by a computer controller, an unused portion of the workpiece not occupied by the first nest pattern, querying, by a computer controller, a remote database to identify a remote second part to be cut, wherein the second part comprises material characteristics corresponding to the characteristics of the workpiece and is nestable in the unused portion of the workpiece, and nesting the local first part and the remote second part on the workpiece.

20 Claims, 3 Drawing Sheets

(56) References Cited

U.S. PATENT DOCUMENTS

| | | | | |
|---|---|---|---|---|
| 7,774,080 B2* | 8/2010 | Holzner | ............. | A61C 13/0004 |
| | | | | 433/201.1 |
| 9,229,444 B2* | 1/2016 | Baierl-Moehler | ............................ | |
| | | | | G05B 19/40938 |
| 9,317,626 B2* | 4/2016 | Chan | ........................ | G06F 17/50 |
| 2004/0236459 A1* | 11/2004 | Clayton | ............. | G05B 19/4097 |
| | | | | 700/171 |
| 2005/0122346 A1* | 6/2005 | Horn | ........................ | G06F 17/50 |
| | | | | 345/629 |
| 2016/0271718 A1* | 9/2016 | Fagan | .................. | B23K 10/006 |
| 2017/0255183 A1* | 9/2017 | Clement | ................ | B25J 9/1697 |

* cited by examiner

SYSTEM AND METHOD FOR PROCESSING PARTS ON A WORKPIECE

CROSS REFERENCE TO RELATED APPLICATION[S]

This application claims the benefit of U.S. Provisional Patent Application No. 62/448,545, filed Jan. 20, 2017, the disclosure of which is hereby incorporated entirely herein by reference.

BACKGROUND

Technical Field

This disclosure relates generally to manufacturing systems and processes, and in particular to the processing of parts on a workpiece.

State of the Art

Component parts of manufactured items are often cut out of a larger workpiece and thereafter joined together or assembled by various fastening methods, including welding, crimping, soldering, brazing, gluing, and the like, to form the desired manufactured item.

Based on the size and shape of the desired component parts, as well as the timing of the need for the component parts, the component parts can be arranged on and cut out of the workpiece without, or prior to, the workpiece producing a maximum material yield. That is, when the component parts are cut out of the workpiece there may yet remain seemingly valuable portions of the workpiece that are unused, or at least underutilized. And, more than this, the size and shape of the unused portions of the workpiece may be such that the unused portions cannot further be exploited and are discarded. Regardless, processing a workpiece without potential for maximum material yield results in inefficiency and waste.

Conventional approaches have been made to attempt to address these concerns, but there nevertheless remains a need in the industry for an improved system and method of processing component parts on a workpiece. Indeed, the differences between conventional and traditional approaches will become apparent to one of skill in the art, through comparison of such approaches with embodiments of the present disclosure as set forth in the remainder of the present application with reference to the drawings.

SUMMARY

The present disclosure relates to manufacturing processes, and in particular to the processing of component parts on a workpiece, wherein the component parts may be nested together on the workpiece to produce maximum material yield of usable parts.

An aspect of the present disclosure includes a method for nesting parts on a workpiece, the method comprising: identifying characteristics of a workpiece to be processed; nesting, by a computer controller, a first nest pattern of a local first part to be cut out of the workpiece; identifying, by a computer controller, an unused portion of the workpiece not occupied by the first nest pattern; querying, by a computer controller, a remote database to identify a remote second part to be cut, wherein the second part comprises material characteristics corresponding to the characteristics of the workpiece and is nestable in the unused portion of the workpiece; and nesting the local first part and the remote second part on the workpiece.

Another aspect of the present disclosure includes wherein the remote second part is entirely nestable in the unused portion of the workpiece.

Another aspect of the present disclosure includes wherein the local first part is received by the computer controller from a first source of a plurality of sources.

Another aspect of the present disclosure includes wherein the remote second part is received by the computer controller from a second source of the plurality of sources, the first and second sources being entirely unaffiliated with one another.

Another aspect of the present disclosure includes wherein the characteristics of the workpiece and the remote second part include a material type and a material thickness.

Another aspect of the present disclosure includes wherein the first nest pattern and the remote second part are co-mingled on the workpiece.

Another aspect of the present disclosure includes wherein the first nest pattern and the remote second part are nested in the workpiece in separate regions of the workpiece.

Another aspect of the present disclosure includes wherein the local first part is submitted to the computer controller at a first physical location of the computer controller and the remote second part is submitted to the remote database from a second physical location at a distance from the computer controller but within a geographic boundary relative to the computer controller, the geographic boundary having about a mile radius.

Another aspect of the present disclosure includes cutting the local first part and the remote second part from the workpiece.

Another aspect of the present disclosure includes a method for nesting parts on a workpiece, the method comprising: receiving geometric characteristics of a workpiece to be processed from a first user by a computer controller over a network; receiving a first part program by the computer controller from the first user over the network, the first part program to be processed from the workpiece; creating an initial nest pattern of the first part program by the computer controller; identifying, by the computer controller, an un-nested portion of the workpiece; searching, by the computer controller, a database of stored fill parts to be processed, the stored fill parts received over the network by a second user; selecting, by the computer controller, at least one of the stored fill parts that fits within the un-nested portion of the workpiece; and nesting the first part program and the selected stored fill part to the workpiece.

Another aspect of the present disclosure includes wherein the second user is wholly unaffiliated with the first user.

Another aspect of the present disclosure includes wherein the database includes material characteristics of the stored fill parts and the computer controller selects the at least one of the stored fill parts based on the material characteristics of the stored fill part corresponding to material characteristics of the workpiece.

Another aspect of the present disclosure includes presenting a processing cost by the computer controller to one or both of the first user and the second user for acceptance thereof prior to the sending the nested first part program and the selected stored fill part to a cutting device for processing.

Another aspect of the present disclosure includes wherein the cutting device is one of a plasma cutter, a laser cutter, and a waterjet cutter.

Another aspect of the present disclosure includes cancelling the nesting of the first part program and the selected stored fill part by the computer controller when the second user fails to accept the processing cost within a predetermined time period.

Another aspect of the present disclosure includes a method of processing by a computer controller component parts in a workpiece from a plurality of job requests, the method comprising: identifying by a computer controller characteristics of a workpiece to be processed; receiving a first job request to the computer controller, the first job request comprising first component parts to be cut from the workpiece; querying by a computer controller a remote database of second job requests received by the remote database over a digital communication network, each of the second job requests comprising second component parts to be cut; nesting the first component parts and the second component parts in a composite nesting pattern in the workpiece, such that the first component parts and the second component parts are processed together from the workpiece.

Another aspect of the present disclosure includes wherein the first job request is submitted by a user of the computer controller and the second job request is submitted by a second user separated from the computer controller but for the digital communication network.

Another aspect of the present disclosure includes cutting the composite nesting pattern by a cutting device operatively coupled the computer controller.

The foregoing and other features, advantages, and construction of the present disclosure will be more readily apparent and fully appreciated from the following more detailed description of the particular embodiments, taken in conjunction with the accompanying drawings.

BRIEF DESCRIPTION OF THE DRAWINGS

Some of the embodiments will be described in detail, with reference to the following figures, wherein like designations denote like members.

DETAILED DESCRIPTION OF EMBODIMENTS

A detailed description of the hereinafter described embodiments of the disclosed apparatus and method are presented herein by way of exemplification and not limitation with reference to the Figures listed above. Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure.

As a preface to the detailed description, it should be noted that, as used in this specification and the appended claims, the singular forms "a", "an" and "the" include plural referents, unless the context clearly dictates otherwise.

Many of the details, dimensions, angles and other features shown in the Figures are merely illustrative of particular embodiments. Accordingly, other embodiments can have other details, dimensions, angles and features. In addition, further embodiments can be practiced without several of the details described below.

Referring to the drawings, FIGS. 1-5 depict one or more embodiments of a manufacturing system 100 for manufacturing component parts from a workpiece and associated methods thereof. Embodiments of the system and method may comprise various structural and functional components and/or steps that complement one another to provide the unique functionality, performance and methodology of the disclosed system and method, which will be described in greater detail herein.

Figure 1:
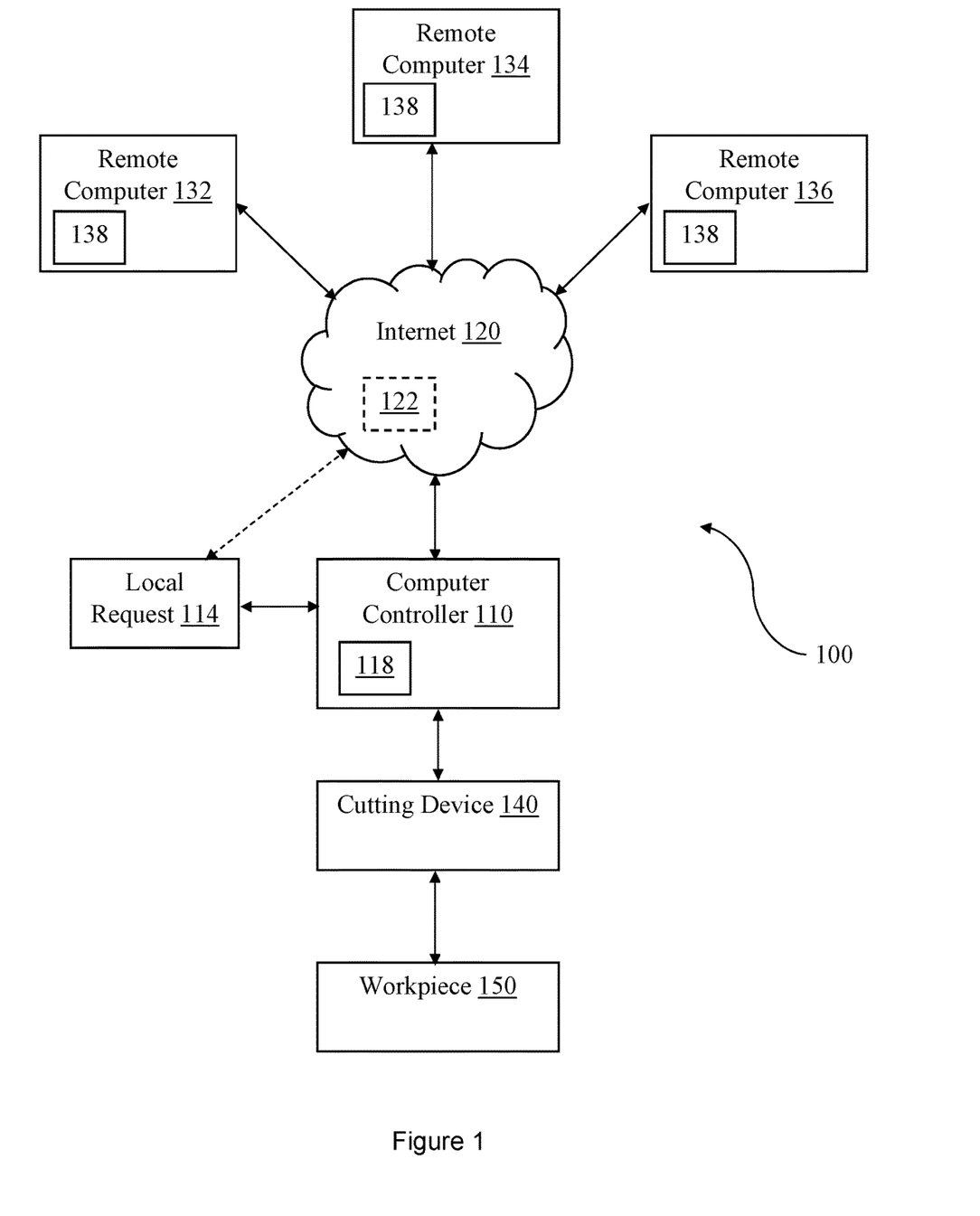
FIG. 1 is a schematic view of a component part manufacturing system from a workpiece, in accordance with the present disclosure.

Referring now to FIG. 1, a computer-implemented system 100 for manufacturing component parts of a desired project/job from a workpiece, such as sheet metal or other material, is depicted. Embodiments of the system 100 may comprise a computer controller 110, such as a computer or computer system capable of controlling the system 100. The computer controller 110 may comprise, for example, a computer-system configuration, including single-processor or multi-processor computer systems, minicomputers, mainframe computers, as well as personal computers, hand-held computing devices, microprocessor-based or programmable consumer electronics, and the like, each of which may be operatively coupled to one or more associated devices and each of which may be operatively coupled to a local area network (LAN), a cloud-computing environment, and/or the Internet 120.

Embodiments of the system 100 may further comprise the computer controller 110 including a processing unit, a system memory, and a system bus. The processing unit may be those known in the art and commercially available. The system memory may include read only memory (ROM) and random access memory (RAM). The system bus may be of a known type and may couple system components including, but not limited to, the processor or processing unit to the system memory. Stored in the ROM, a basic input/output system (BIOS) may contain the basic instructions and/or routines that transfer information between elements within the computer. RAM typically contains data and/or program modules that are immediately accessible to and/or presently being operated on by the processor or the processing unit.

Embodiments of the system 100 may further comprise the computer controller 110 including some form of data storage, system memory, and/or other similar computer storage media. For example, the computer controller 110 may include a hard disk drive (HDD) that reads from or writes to non-removable, nonvolatile magnetic media and nonvolatile optical disk such as a CD ROM, DVD, or other optical media. The long-term data storage may additionally, or in the alternative, comprise a solid-state drive (SSD) that uses integrated circuit assemblies as memory to store data persistently. The storage drives and their associated computer storage media provide storage of computer-readable instructions, data structures, program modules and other data for the computer controller 110, such as, for example, an operating system, application programs, and other program modules and program data. Computer storage media may also include EEPROM, flash memory or other electronic solid-state memory technology, or other optical disk storage, or other magnetic storage devices, or any other medium which can be used to store the desired information and which can accessed by the computer controller 110.

Embodiments of the system 100 may further comprise the computer controller 110 including a user interface and/or input device, such as a keyboard, pointing device, such as a mouse or touchpad, voice-command such as a microphone, and/or tablet-based interface. The user interface and/or input device may be operated by a user to input commands and information to the system 100, or in other words to govern the operational and functional aspects and programs of the system 100. For example, the user interface may be utilized by the user to input the local request 114 for part manufacture from the workpiece 150 to the system 100.

Embodiments of the system 100 may further comprise the computer controller 110 including a display. The display may be configured to receive and display to a user the data that is electronically received from the processor or the processing unit. The display may comprise, for example, an LCD, OLED, or other known display type that presents data in electronic form. The display may also be configured with and function as a touch-screen input. For example, the display may be physically coupled to a housing in which the computing device is incorporated, such as in a tablet-type personal computer. Alternatively, or in addition, the display can present data in a hard copy format such as a printed copy from a printer or facsimile.

The computer controller 110 may operate in a networked or cloud-computing environment 120 using logical connections to one or more remote devices, such as remote computers 132, 134, and 136. The remote computers 132, 134 and 136 may be one or more of a personal computer, a server, a router, a network PC, a peer device or other common network node, and typically includes many or all of the elements described above. The logical connections may include one or more local area networks (LAN) and one or more wide area networks (WAN), but may also include other networks. When used in a LAN networking environment, the computer controller 110 may be connected to the local network through a network interface or adapter. When used in a WAN networking environment, the computer controller 110 may include a modem, or is connected to a communications server on the LAN, or has other means for establishing communications over the WAN, such as the Internet 120. It will be appreciated that network connections described herein are exemplary and other means of establishing a communications link between the computer controller 110 and the remote computers 132, 134, and 136 may be used.

Embodiments of the system 100 may further comprise a cutting device 140. The cutting device 140 may include computer numerical control (CNC), which is the automation of machine tools by means of computers executing preprogrammed sequences of machine control commands. Embodiments of the system 100 may include the cutting device 140 having its own processor, electronic storage device, and interface for providing control instructions thereto to perform cutting operations on a workpiece 150, from which component parts of a job request are to be cut. The storage or memory device on the cutting device 140 may be internal or external and can contain data relating to the part to be cut in the workpiece 150. In other embodiments, the cutting device 140 may be manually programmed, and in some embodiments the cutting device 140 can include a computer readable product that includes computer readable instructions that can select or configure operating parameters of the cutting device 140. In further exemplary embodiments the computer readable instructions can be cut charts or nesting software. The nesting software may be stored locally on a computer (such as a PC) or the nesting software may be software that is accessible and used online, such as software in the cloud or software stored on a remote network, server, or data storage device. The computer readable instructions typically include cutting information including instructions for the system 100 when cutting various holes or contour lines, taking into account the sizes and shapes of the holes/contours and the material being cut. For example, with regard to the material being cut, ranges of gage thicknesses may extend to ¼" to ½" to 1" to 2" and even thicker in some cases. The cutting device 140 can allow a user to cut numerous successive holes, contour lines or a combination of holes and contours in a workpiece 150 without stopping between cuts. For example, the operator can select a cutting program that includes both hole and contour cutting instructions, and the cutting device 140 can determine the order and positioning of the cuts, as well as the various parameters of the cuts based on the user input information.

The cutting device 140 may be configured to stand alone from the computer controller 110, but yet be in operative or functional communication with the computer controller 110, such that data processing, program execution, cutting instructions, commands, directives, and/or the like are provided from the computer controller 110 to the cutting device 140 to govern the operation of the cutting device 140. In this way, the computer controller 110 may be configured to govern the operational aspects of the cutting device 140, despite the cutting device 140 being also capable of receiving independent input directly from the user/operator as to a job request for the workpiece 150, as described above. In other words, embodiments of the system 100 further comprise the computer controller 110 being configured in such a way so as to allow the user/operator to govern the desired operation of the cutting device 140 and input job requests to the cutting device 140 from the computer controller 110.

Alternatively, the computer controller 110 may form part and portion of the cutting device 140, such that the structure and function of the computer controller 110, as described herein, forms part of and governs the operational aspects of the cutting device 140, such that the computer controller 110 and the cutting device 140 are one in the same unit. In other words, embodiments of the system 100 may comprise the computer controller 110 being the heart and soul of the cutting device 140, while the mechanical cutting components thereof perform or carry out the programmed directives or instructions.

Embodiment of the system 100 may comprise the cutting device 140 being, for example, a plasma cutter, a laser cutter, or a waterjet cutter. The cutting device 140 may be associated, for example, with applications related to the processing of flat sheet or plate material, such as, for example and not limited thereto, mild steel, stainless steel aluminum, stone or other commonly processed sheet materials.

Figure 2:
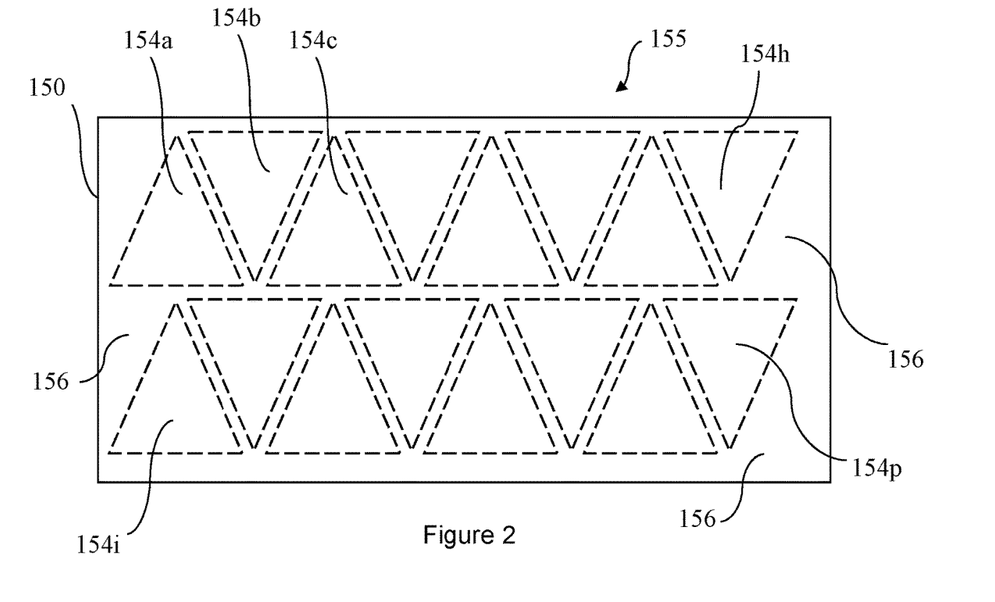
FIG. 2 is a top view of a workpiece having component parts nested therein, in accordance with the present disclosure.
Figure 3:
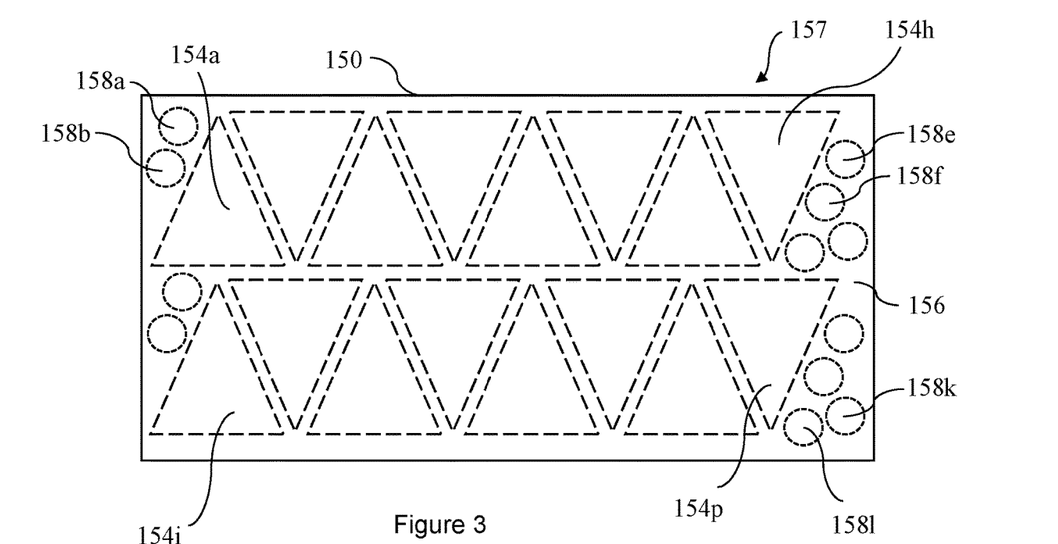
FIG. 3 is a top view of a workpiece having component parts nested therein, in accordance with the present disclosure.

With reference now to FIGS. 1 and 2, embodiments of the system 100 may further comprise a workpiece 150 from which component parts 154 of a job request can be cut. Each job request may comprise one or more part descriptions for one or more individual parts to be cut. These part descriptions may include, for example, but not limited thereto, material type, material thickness, number of copies, the type of machine to perform the cutting operation (i.e., plasma, laser, waterjet, oxy), tolerances and the like for each of the component parts 154. The exemplary component parts 154 depicted in FIG. 2 assume geometric shapes in the form of triangles. Other geometric shapes such as circles, squares, rectangles, diamonds, ovals, and the like could also have been chosen to illustrate the component parts 154. However, in real-world applications, parts (such as parts 154) to be cut from the workpiece 150 can be very complex and can include combinations of both simple and intricate geometric shapes. Further thereto, a set of component parts 154 placed on a sheet of plate, such as workpiece 150, to be cut in one operation may be referred to as a "nesting of parts" or simply a "nest".

Embodiments of the system 100 may comprise nesting software programs and/or systems stored in and executable by the computer controller 110 and/or cutting device 140, as the case may be. The nesting software may be configured to distribute individual component cutting profiles of component parts, for example, parts 154, on a panel or sheet of material, such as workpiece 150, for optimum material utilization. It is contemplated that the nesting software and/or system of the present disclosure may utilize a mathematical algorithm to derive numerous permutations of part placement patterns, and then can select the pattern most favorable for maximum material output and/or conservation. Moreover, the nesting software and/or system includes means for specifying a tolerance between adjacent contour paths (i.e., adjacent component parts), executing one or more computer instructions to generate a sequence of move commands, whereby each move command signal indicates a desired position of the cutting tool relative to a fiducial mark or reference point such as a location on the workpiece 150.

Referring again to FIG. 2, a plurality of individual component parts 154a, 154b, 154c, . . . and so on and so forth, to 154p, are depicted in dotted-lines as being "nested" on the workpiece 150 in an optimal pattern determined by the nesting program executed by the computer controller 110. Such component parts 154 may be submitted to the computer controller 110 as a job request or a local request 114 (i.e., the request is "local" as it is made at the computer controller 110 or at the physical facility where the computer controller 110 is present, such as through a LAN or WAN established and maintained at the physical facility where the controller 110 is present). Having received the local request 114, including therein the part descriptions of the component parts 154, the computer controller 110 may run the nesting program to "nest" the component parts 154 in a first nesting pattern 155 in the workpiece 150, as depicted in FIG. 2. Yet, after nesting, an unused portion 156 of the workpiece 150 may yet remain available, the unused portion 156 being defined outside the dotted-line boundaries of the collective component parts 154 but within the solid-line exterior boundaries of the workpiece 150. If left idle or unexploited, the unused portion 156 may become waste material to be discarded after the component parts 154 are cut from the workpiece 150.

With reference again to FIG. 1, embodiments of the system 100 may further comprise the computer controller 110 being configured to connect to and communicate with one or more remote computers 132, 134, and 136 through the Internet 120, as described herein. The computer controller 110 may be configured to receive, accept, query, request, find, or otherwise obtain data, instructions, and/or job requests 138 from third parties not affiliated with the owner of the computer controller 110 or cutting device 140 by way of the one or more remote computers 132, 134, or 136 through the Internet 120. The computer controller 110 may comprise software or computer programming executable by the computer controller 110 for requesting, accepting, querying, or otherwise obtaining remote job requests 138 from these third parties for manufacture of desired component parts from a desired plate sheet of material from the one or more remote computers 132, 134, or 136 through the Internet 120. The computer controller 110 may further comprise a job request inventory or database 118 of job requests (114 and/or 138), wherein the job requests 138 obtained from or sent by the third parties through the one or more remote computers 132, 134, or 136 through the Internet 120 are stored in the database 118. The job requests 138 may be posted, sent to, or stored in the database 118 by a user/operator of the one or more remote computers 132, 134, or 136 for potential completion by the cutting device 140 associated with the computer controller 110. Each job request (114 and/or 138) may be securely stored in the database 118 by a particular user/operator, such that other users cannot delete, alter, amend, or otherwise change, the job request (114 and/or 138) without previous permission from the particular user/operator.

Embodiments of the system 100 may further comprise the job request inventory or database being configured in a cloud-based storage database 122. As described herein, the computer controller 110 as well as the one or more remote computers 132, 134, or 136 may be connected to and communicate with one another or with the database 122 through the Internet 120. As such, the job requests 138 obtained from the one or more remote computers 132, 134, or 136 through the Internet 120 and the queries regarding potential job requests for execution, nesting, or completion by the cutting device 140 with the help of the computer controller 110 may be stored in the database 122. In this embodiment, the computer controller 110, as well as the one or more remote computers 132, 134, or 136 may access the database 122 to post, amend, edit, remove, alter, store, retrieve, send, add, or otherwise manage the job requests 138 for manufacture of desired component parts from a desired plate sheet of material for which they have permission, much like the methodology and function of the database 118 described above.

Embodiments of the system 100 may further comprise the computer controller 110 being configured to view, filter, categorize, analyze, parse, select, sort, retrieve, examine, inspect, or otherwise use any one of the job requests (114 and/or 138) to determine if one or more of the job requests (114 and/or 138) in the database 118 (or likewise database 122) may be implemented into a nesting pattern of the workpiece 150. For example, with further reference to FIGS. 2 and 3, the computer controller 110 may receive a local request 114 for manufacture of component parts 154a-154p out of the workpiece 150. The nesting software of the computer controller 110 may determine the optimal nesting pattern of the component parts 154a-154p, such as the first nesting pattern 155 depicted in FIG. 2. Thereafter, the computer controller 110 may access the database 118 or 122 to sort through and examine each of the plurality of remote job requests 138 stored in the database 118 or 122 to find a job request 138 that may be nested satisfactorily within the unused portion 156 of the workpiece 150. Once found, the nesting program or software may nest each of the plurality of individual component parts 158a, 158b, 158c, . . . and so on and so forth, to 158l of the remote job request 158 within the unused portion 156 of the workpiece 150 in a second nesting pattern 157, as exemplarily depicted in FIG. 3. In this way, each of the component parts 158a-158l may be appropriately nested in the previously unused portion 156 of the workpiece 150.

Embodiments of the system 100 may comprise the computer controller 110 running software or computer programming to compare job requests 114 and 138 with properties of the plate sheet materials that are available to determine what job requests 114 and 138 may be completed. If the characteristics of the job requests 114 and 138 match one another and match the properties of the workpiece 150, or the job request 114 and 138 are at least compatible to be nested together on the workpiece 150, the computer controller 110 may propose that the selected job requests 114 and 138 be cut from same workpiece 150. For example, each of the local requests 114 and the remote job requests 138 may comprise characteristics related thereto, such as, for example, but not limited thereto, size and dimensions of component parts to be cut, type of material from which the component parts are to be cut, the material thickness, the number of similar component parts to be cut, the due date by which the job should be completed, the geographic location from which the remote job request 138 is initiated/originated, whether shipping of cut component parts is needed, whether pick-up of cut component parts from the location of the cutting device 140 is acceptable, and the cost or price of completing the proposed requests 114 and/or 138. The price or cost of the remote job request 138 may be proposed by the user/operator of the remote computers 132, 134, and 136 or by the user/operator of the computer controller 110 and/or cutting device 140 to one another. Then, the other party may confirm or accept the proposed price prior to proceeding to cut the component parts from the workpiece 150. Alternatively, the other party may propose an alternative price, or may negotiate the price, until both parties are satisfied, at which time the cutting of the component parts from the workpiece 150 may be performed.

To do so, the computer controller 110 may analyze any number of the characteristics of the job requests 114 and 138 and propose a combined nested pattern of local requests 114 and remote job requests 138 on an acceptable workpiece 150. A user/operator of the computer controller 110 and/or the cutting device 140 may then approve or reject the proposed nested pattern. If approved, the cutting device 140 may proceed to cut the component parts from the workpiece 150. If rejected, the computer controller 110 may release the local requests 114 and remote job requests 138 back into the database 118 or 122 for future or additional processing.

Further, the computer controller 110 may be configured to nest a local request 114 on the workpiece 150 (thus giving priority to the local request 114) and thereafter query the database 118, 122 to find a remote job request 138 that not only matches the material characteristics of the local request 114 but also satisfactorily nests into the previously unused portion 156 of the workpiece 150. The local request 114 may be a request for processing of component parts 154 from the workpiece 150 by an agent of or within the company that owns and operates the computer controller 110 and/or the cutting machine 140. On the other hand, the remote job request 138 may be submitted to the database 118 or 122 over the Internet 120 by a third party wholly unaffiliated with the owner of and/or the user/operator of the computer controller 110 and/or the cutting machine 140. The term "unaffiliated" as used herein may mean its standard definition of "not officially attached to or connected with an organization or group," or may also mean having no ownership in, employment by, or professional relationship with the owner and/or company that owns and operates the computer controller 110 and/or the cutting device 140. In fact, the third party that submits the remote job request 138 to the computer controller 110 through one of the remote computers 132, 134, or 136 through the Internet 120 may have no affiliation whatsoever with the owner and/or company that owns and operates the computer controller 110 and/or the cutting device 140, except for the remote job request 138.

The third party may also be located at a distance from the cutting device 140. The third party may be located at a distance such that the completed job request 138 cannot be picked up at the location of the cutting device 140 on the same day that the job request 138 is completed, making commercial shipping the requisite choice for getting the component parts 158 of the completed job request 138 to the third party. In such a case, the third party may be considered to be outside a geographic fence or boundary. Alternatively, the third party may be located within the boundary such that the component parts 158 of the completed job request 138 can be picked up at the location of the cutting device 140 on the same day that the job request 138 is completed. The third party within the geographic boundary may be considered a local third party. Alternatively, the third party may be located within a second boundary, closer than the boundary, such that the component parts 158 of the completed job request 138 can be picked up at the location of the cutting device 140 and/or the controller 110 within 12 hours of the job request 138 being completed. The third party within the second boundary may be considered a neighboring third party. Also, the neighboring third party may also be located within 6-10 hours of drive time of the cutting device 140 and/or the controller 110. Also, the neighboring third party may be located within 3-6 hours of drive time of the cutting device 140 and/or the controller 110. Also, the neighboring third party may be located within 1-3 hours of drive time of the cutting device 140 and/or the controller 110. The neighboring third party may be located within 25-50 miles of the cutting device 140 and/or the controller 110. The neighboring third party may be located within 10-25 miles of the cutting device 140 and/or the controller 110. The neighboring third party may be located within 1-10 miles of the cutting device 140 and/or the controller 110. The neighboring third party may be located about or within 1 mile of the cutting device 140 and/or the controller 110.

The closer the third party is to the cutting device 140, the less cost that may be associated with the third party obtaining the component parts 158 of the remote job request 138 and the more willing the owner and/or company that owns and operates the computer controller 110 and/or the cutting device 140 may be to perform or otherwise fill the requested remote job request 138. The third party may also be recognized herein as the second requestor (i.e., the user or operator that sends the remote job request 138 to the controller 110 via the Internet 120 and hopes the controller 110 can select the remote job request 138 for completion with one or more local requests 114 submitted by the first requestor).

Further, the computer controller 110 may be configured to obtain a local request 114 and thereafter query the database 118, 122 to find a remote job request 138 that not only matches the material characteristics of the local request 114 but also satisfactorily nests into the workpiece 150 together with the local request 114 (thus giving each of the local request 114 and the remote job request 138 equal priority). As stated above, the third party that submits the remote job request 138 may wholly unaffiliated with the owner and/or company that owns and operates the computer controller 110 and/or the cutting device 140, as described herein.

Figure 4:
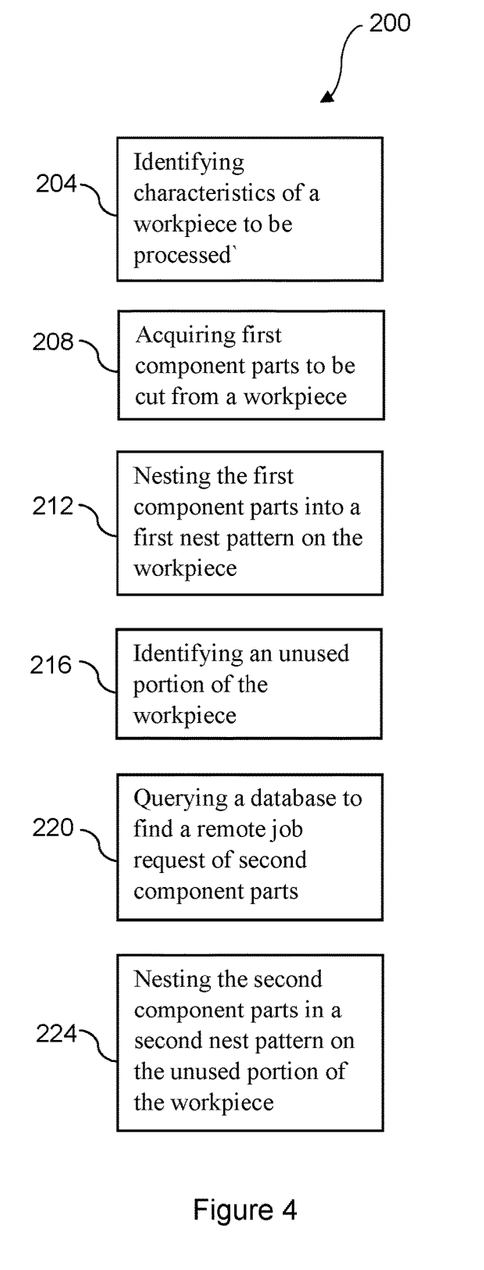
FIG. 4 is a logic flowchart of a method of processing component parts from a workpiece, in accordance with the present disclosure.
Figure 5:
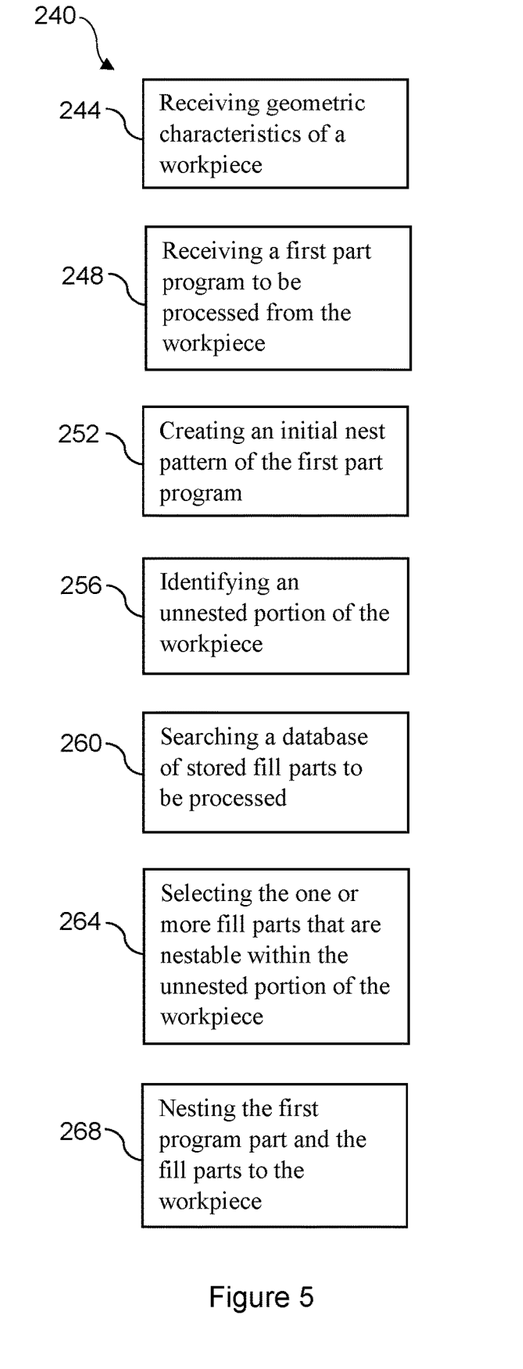
FIG. 5 is a logic flowchart of a method of processing component parts from a workpiece, in accordance with the present disclosure.

Incorporating the methodology discussed above entirely herein by reference and referring to the logic-flow diagrams of FIGS. 4 and 5, exemplary methods 200 and 240 of manufacturing component parts from a workpiece are illustrated. As depicted in FIG. 4, the controller 110 may identify characteristics of a workpiece 150 to be processed, as shown in step 204. The controller 110 may acquire a part program containing first component parts to be processed and cut from the workpiece 150, as shown in step 208. The controller 110 may nest the first component parts into a first nest pattern on the workpiece 150, as shown in step 212. The controller may identify an unused portion of the workpiece 150 on which the first component parts have not been nested according to the first nesting pattern, as shown in step 216. The controller 110 may query a database in the controller 110 or located elsewhere, such as in the cloud 122, for a remotely submitted job request containing second component parts to be processed, the second component parts being of a material of suitable size, shape, and type to that of the first component parts, such that the first and second component parts may be processed together on the workpiece 150, as shown in step 220. The controller 110 may nest the second component parts in a second nest pattern that fits or co-nests with the unused portion of the workpiece 150, as shown in step 224. The controller 110 may thereafter instruct a cutting device to cut the first and second component parts from the workpiece 150.

The associated methods of the system described herein may further comprise the exemplary method 240 of FIG. 5, wherein the controller 110 may be configured to receive characteristics of a workpiece to be processed from a first user over a network, as shown in step 244. The controller 110 may receive a first part program from the first user over the network, wherein characteristics of the first part program match the characteristics of the workpiece 150 so the first part program may be processed in/by the workpiece 150, as shown in step 248. The controller 110 may create an initial nest pattern of the component parts of the first part program, as shown in step 252. The controller 110 may identify an unnested portion of the workpiece, as shown in step 256. The controller 110 may search a database of stored fill parts to be processed, wherein the stored filled parts are received over the network by a second user, as shown in step 260. The controller 110 may select one or more parts from the stored fill parts that have the same characteristics of the first part program and the workpiece and are nestable within the unnested portion of the workpiece 150, as shown in step 264. The controller 110 may nest the first part program and the fill parts to the workpiece 150. The controller 110 may thereafter instruct a cutting device to cut the composite nesting pattern of first and second component parts from the workpiece 150.

The associated methods of the system described herein may further comprise the controller 110 confirming the acceptance of the requestor of the first component parts and/or the requestor of the second component parts prior to the controller 110 instructing the cutting device 140 to cut the nested parts in the workpiece 150. The controller 110 may identify a second part to be processed or a fill part to be processed that was requested from a location within a specific geographic boundary to the cutting device 140, such as the boundary or the second boundary discussed above. The controller 110 may be configured to co-mingle the first nest pattern with the second nest pattern. Alternatively, the controller 110 may be configured to keep the first nest pattern in a region of the workpiece 150 that is separate and apart from a region of the second nest pattern on the workpiece, but the first and second nesting patterns always being positioned on the workpiece 150. The controller 110 may further propose or present to the requestors of the first and second component parts, respectively, a processing cost or price for performing the cutting of component parts prior to cutting the component parts. The controller 110 may require acceptance of the proposed processing costs prior to commencing the cutting process. Alternatively, the controller 110 may further propose or present to the requestor of the second component parts, a processing cost or price for performing the cutting of second component parts prior to cutting the component parts together on the workpiece 150. The controller 110 may be configured to offer or propose the price to the second requestor with a request that the second requestor reply within a set period of time or risk having the proposed price withdrawn and the proposed job canceled.

The associated methods of the system described herein may further comprise the controller 110 being configured to identify characteristics of a workpiece 150 to be processed, including characteristics thereof, such as size, shape, geometry, thickness, etc. The controller 110 may acquire a part program containing first component parts to be processed and cut from the workpiece 150. The controller 110 may query a database in the controller 110 or located elsewhere, such as in the cloud 122, for a remotely submitted job request among a plurality of remotely submitted job requests, the remotely submitted job request containing second component parts to be processed, the second component parts being of a material of suitable size, shape, and type to that of the first component parts, such that the first and second component parts may be processed together on the workpiece 150. The controller 110 may calculate a composite nesting pattern comprised of first component parts and second component parts, such that the first and second component parts may be nested and cut from the same workpiece 150 to maximize material yield from the workpiece 150 based on the plurality of remotely submitted job requests available to the controller 110. The controller 110 may thereafter instruct a cutting device to cut the composite nesting pattern of first and second component parts from the workpiece 150.

While this disclosure has been described in conjunction with the specific embodiments outlined above, it is evident that many alternatives, modifications and variations will be apparent to those skilled in the art. Accordingly, the preferred embodiments of the present disclosure as set forth above are intended to be illustrative, not limiting. Various changes may be made without departing from the spirit and scope of the present disclosure, as required by the following claims. The claims provide the scope of the coverage of the present disclosure and should not be limited to the specific examples provided herein.

What is claimed is:

1. A method for nesting parts on a workpiece, the method comprising:
identifying characteristics of a workpiece to be processed;
nesting, by a computer controller, a first nest pattern of a local first part to be cut out of the workpiece, the first nest pattern being an optimal nesting pattern of the local first part;
identifying, by the computer controller, an unused portion of the workpiece not occupied by the first nest pattern;
querying, by the computer controller, a remote database to identify a remote second part to be cut, wherein the second part comprises material characteristics corresponding to the characteristics of the workpiece and is nestable in the unused portion of the workpiece;

using the computer controller to derive a calculation of a composite nesting pattern comprising the local first part and the remote second part to maximize material yield of the workpiece; and adjusting the first nest pattern, based on the calculation, to nest the local first part and the remote second part on the workpiece such that the local first part and the remote second part are co-mingled in location within a portion of the workpiece.

2. The method of claim 1, wherein the remote second part is entirely nestable in the unused portion of the workpiece.

3. The method of claim 1, wherein the local first part is received by the computer controller from a first source of a plurality of sources.

4. The method of claim 3, wherein the remote second part is received by the computer controller from a second source of the plurality of sources, the first and second sources being unaffiliated with one another.

5. The method of claim 1, wherein the characteristics of the workpiece and the material characteristics of the remote second part include a material type and a material thickness.

6. The method of claim 1, wherein the local first part and the remote second part are processed together from the workpiece.

7. The method of claim 1, wherein the computer controller requires acceptance of a user prior to processing the local first part and the remote second part together from the workpiece.

8. The method of claim 1, wherein the local first part is submitted to the computer controller on a first computer over a first network connected to an internet and the remote second part is submitted to the remote database on a second computer over a second network connected to the internet, and wherein the first and second computers are separated by more than a mile.

9. The method of claim 1, wherein, prior to cutting the local first part and the remote second part from the workpiece, the computer controller presents a cost for cutting the local first part and the remote second part from the workpiece.

10. A method for nesting parts on a workpiece, the method comprising:

receiving geometric characteristics of a workpiece to be processed from a first user by a computer controller over a network;

receiving a first part program by the computer controller from the first user over the network, the first part program to be processed from the workpiece;

creating an initial nest pattern of the first part program by the computer controller;

identifying, by the computer controller, an un-nested portion of the workpiece;

searching, by the computer controller, a database of stored fill parts to be processed, the stored fill parts received over the network by a second user;

selecting, by the computer controller, at least one of the stored fill parts that fits within the un-nested portion of the workpiece;

calculating a composite nesting pattern comprising the first part program and the selected stored fill part that maximizes a material yield from the workpiece; and based on the composite nesting pattern, adjusting the initial nest pattern comprising the first part program to create the composite nesting pattern, which includes nesting and co-mingling the first part program and the selected stored fill part in the workpiece.

11. The method of claim 10, wherein the second user is unaffiliated with the first user.

12. The method of claim 10, wherein the database includes material characteristics of the stored fill parts and the computer controller selects the at least one of the stored fill parts based on material characteristics of the selected stored fill part corresponding to material characteristics of the workpiece.

13. The method of claim 12, wherein the material characteristics of the workpiece and the material characteristics of the selected stored fill part include a material type and a material thickness.

14. The method of claim 10, further comprising sending the first part program and the selected stored fill part to a cutting device for processing.

15. The method of claim 14, wherein the cutting device comprises at least one of a plasma cutter, a laser cutter, and a waterjet cutter.

16. The method of claim 14, further comprising presenting a processing cost by the computer controller to one or both of the first user and the second user for acceptance thereof prior to the sending the first part program and the selected stored fill part to the cutting device for processing.

17. The method of claim 16, further comprising cancelling the nesting and co-mingling of the first part program and the selected stored fill part by the computer controller when the second user fails to accept the processing cost within a predetermined time period.

18. A method of processing by a computer controller component parts in a workpiece from a plurality of job requests, the method comprising:

identifying by a computer controller characteristics of a workpiece to be processed;

receiving a first job request to the computer controller, the first job request comprising first component parts to be cut from the workpiece;

creating an initial nest pattern of the first component parts;

querying the computer controller a remote database of second job requests received by the remote database over a digital communication network, each of the second job requests comprising second component parts to be cut;

calculating a composite nesting pattern comprising the first component parts and the second component parts and that maximizes a material yield from the workpiece; and adjusting position of the first component parts of the initial nesting pattern, based on the composite nesting pattern, to create the composite nesting pattern in which the first component parts and the second component parts are co-mingled in the workpiece, such that the first component parts and the second component parts are processed together from the workpiece.

19. The method of claim 18, wherein the first job request is submitted by a user of the computer controller and the second job request is submitted by a second user separated from the computer controller but for the digital communication network.

20. The method of claim 18, cutting the composite nesting pattern by a cutting device operatively coupled the computer controller.

* * * * *